United States Patent
Kamijima

(10) Patent No.: US 7,316,786 B2
(45) Date of Patent: Jan. 8, 2008

(54) METHOD OF POLISHING FILM TO BE POLISHED

(75) Inventor: Akifumi Kamijima, Tokyo (JP)

(73) Assignee: TDK Corporation, Tokyo (JP)

( * ) Notice: Subject to any disclaimer, the term of this patent is extended or adjusted under 35 U.S.C. 154(b) by 100 days.

(21) Appl. No.: 11/289,541

(22) Filed: Nov. 30, 2005

(65) Prior Publication Data

US 2006/0124595 A1 Jun. 15, 2006

(30) Foreign Application Priority Data

Dec. 10, 2004 (JP) ............................. 2004-358787

(51) Int. Cl.
*H01L 21/302* (2006.01)

(52) U.S. Cl. ............................. 216/88; 216/94; 216/89; 451/29; 438/6

(58) Field of Classification Search .................. 216/88
See application file for complete search history.

(56) References Cited

U.S. PATENT DOCUMENTS

2006/0132972 A1* 6/2006 Tagami et al. .............. 360/126

FOREIGN PATENT DOCUMENTS

| JP | A 8-102014 | 4/1996 |
| JP | A 9-246219 | 9/1997 |

* cited by examiner

*Primary Examiner*—Napine Norton
*Assistant Examiner*—Patricia A. George
(74) *Attorney, Agent, or Firm*—Oliff & Berrigde, PLC

(57) ABSTRACT

A method is provided that includes a main laminate making step of forming a plurality of main magnetic poles onto a substrate, covering each magnetic pole with a first protective film, and forming onto the first protective film a stopper film provided with openings at respective parts opposing the main magnetic poles. Each opening is wider than a planar width of a corresponding main magnetic pole, so as to make a main laminate. The method includes a main polishing step of polishing the first protective film and main magnetic poles through the openings of the stopper film in the main laminate by a CMP method. In the main laminate making step, the openings in the stopper film is provided with a width distribution.

8 Claims, 22 Drawing Sheets

Fig.14
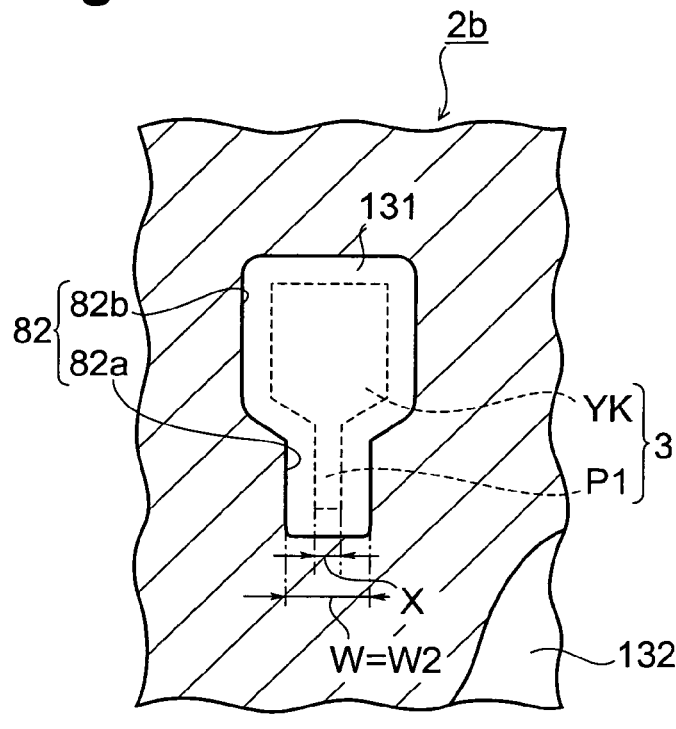
(a)
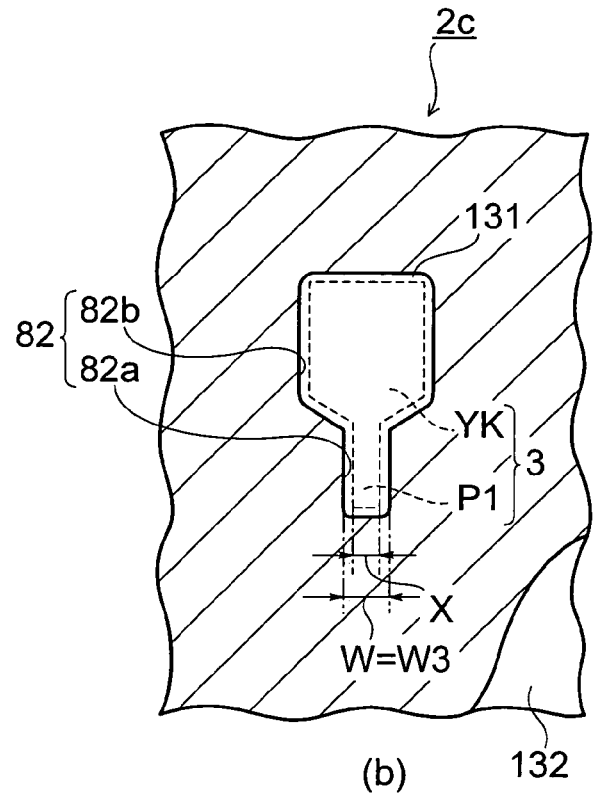
(b)

Fig.19
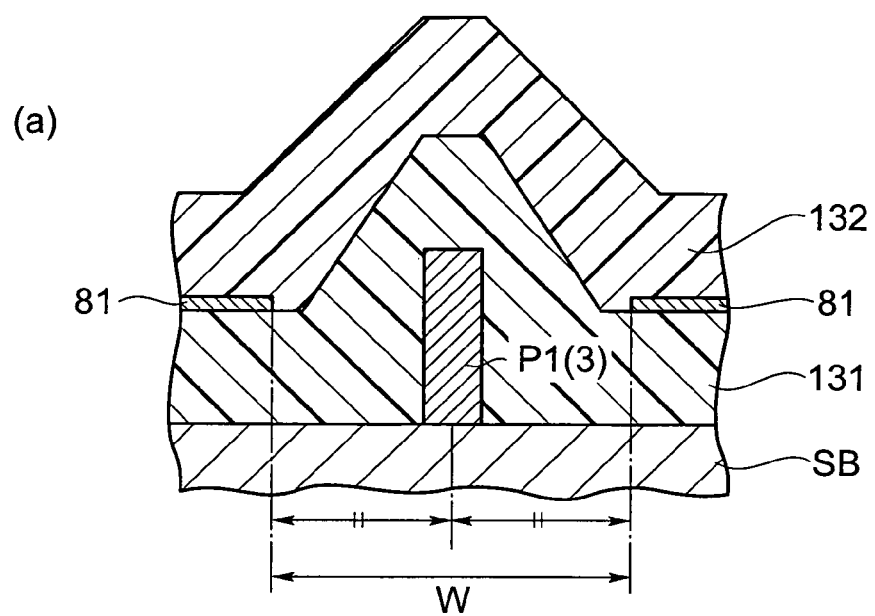
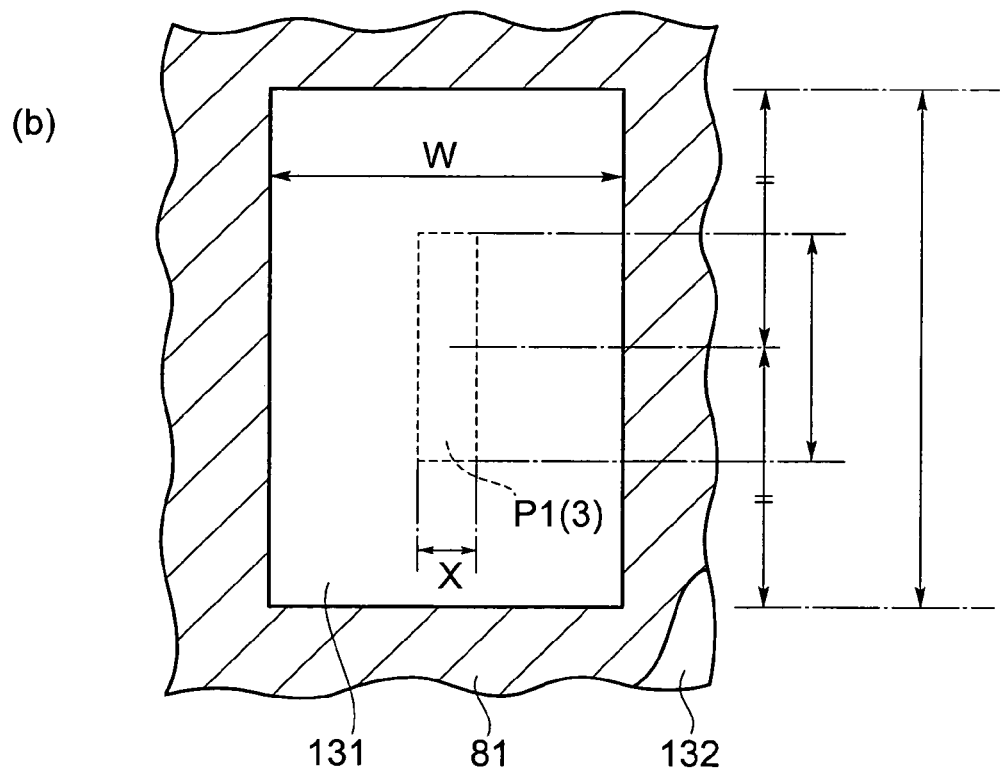

| LAMINATE | | | LOCATION | | | | | DISPERSION (%) |
|---|---|---|---|---|---|---|---|---|
| | | | B1 | B2 | B3 | B4 | B5 | |
| 1ST PRELIMINARY LAMINATE 2a (UNIFORM OPENING SIZE) | BEFORE CMP | MAIN MAGNETIC POLE THICKNESS (nm) | 1000 | 1001 | 1003 | 1006 | 1010 | — |
| | | 1ST PROTECTIVE FILM THICKNESS (nm) | 1000 | 1008 | 1028 | 1062 | 1095 | — |
| | | STOPPER FILM THICKNESS (nm) | 100.0 | 100.1 | 100.2 | 100.4 | 100.8 | — |
| | | 2ND PROTECTIVE FILM THICKNESS (nm) | 1000 | 1008 | 1028 | 1062 | 1095 | — |
| | | STOPPER FILM OPENING WIDTH (μm) | 100 | 100 | 100 | 100 | 100 | — |
| | AFTER CMP | MAIN MAGNETIC POLE THICKNESS (nm) | 797 | 805 | 825 | 859 | 892 | 11.4 |
| MAIN LAMINATE 1 (WITH OPENING SIZE DISTRIBUTION) | BEFORE CMP | STOPPER FILM OPENING WIDTH (μm) | 90 | 100 | 150 | 200 | 250 | — |
| | AFTER CMP | MAIN MAGNETIC POLE THICKNESS (nm) | 802 | 805 | 796 | 799 | 797 | 1.1 |

METHOD OF POLISHING FILM TO BE POLISHED

BACKGROUND

The present invention relates to a method of polishing a film to be polished, in which a plurality of films or a plurality of portions of a patterned film to be polished is polished by a CMP method, so that the thickness of these films or portions to be polished is adjusted to a predetermined value.

In view of demands for smaller sizes, higher-density recording capabilities, etc., the accuracy in thickness of magnetic poles in thin-film magnetic heads, magnetic poles of perpendicular magnetic recording heads in particular, has recently been required to become higher. For example, a normal magnetic pole has a thin rod shape. For instance, the thickness of a main magnetic pole of a perpendicular magnetic recording head is set to several hundred nanometers, whereas its tolerance is about 10%.

Known as a method of precisely adjusting the thickness of a film in a magnetic pole or the like is a CMP method using a stopper film (see, for example, Japanese Patent Application Laid-Open Nos. HEI 8-102014 and HEI 9-246219).

SUMMARY

Specifically, this CMP method covers a magnetic pole (film to be polished) formed on a substrate with a first protective layer; forms a stopper film, that is provided with an opening greater than the magnetic pole and harder to polish than the first protective layer, onto the first protective layer; and polishes the first protective layer and magnetic pole with a polishing agent for CMP through the opening of the stopper film. Consequently, the advancing of the polished surface is restricted by the height of the stopper film, so that the top face of the magnetic pole is positioned at a height somewhat lower than the upper face of the stopper film. Let the polishing depth D be the depth from the upper face of the stopper film to the upper face of the magnetic pole after polishing. Since the polishing depth D becomes greater as the opening width W is wider, the thickness of the film to be polished becomes smaller as the opening width W is greater. Therefore, the height of the top face of the magnetic pole, which indicates the thickness of the magnetic pole, can be regulated with a high accuracy according to the opening width W.

When manufacturing a thin-film magnetic head, several hundreds, for example, of identical thin-film magnetic heads are often formed on a substrate. Therefore, it is necessary for a number of magnetic poles formed on the substrate to regulate their thickness as uniform as possible by the CMP method.

However, it has been found difficult for the magnetic poles to have a uniform thickness with a high accuracy even when they are polished by the CMP method, when the openings of the stopper film provided so as to correspond to the individual magnetic poles have the same opening width W.

In view of the problem mentioned above, it is an object of the present invention to provide a method of polishing a film to be polished which can improve the uniformity in thickness of a plurality of films or film portions to be polished after polishing.

Detailed studies conducted by the inventor have elucidated that the reason why the films to be polished fail to attain a uniform thickness even when the opening width is kept even is that the first protective film, films to be polished, and the like have uneven thicknesses on the substrate from the beginning.

Therefore, the method of polishing a film to be polished in accordance with the present invention comprises a main laminate making step of 1) forming a plurality of films or film portions to be polished onto a substrate; 2) covering each film portion to be polished with a first protective film; and 3) forming onto the first protective film a stopper film provided with openings at respective parts opposing the film portions to be polished, each opening being greater than a planar form of the respective film portion to be polished, so as to make a main laminate. The method also includes a main polishing step of polishing the first protective film and the film portions to be processed through the openings of the stopper film in the main laminate by a CMP method. In the main laminate making step, the stopper film is provided with openings having an opening width distribution.

The present invention can vary the opening width of the openings of the stopper film among the films or portions to be processed. The polishing depth D of the main magnetic pole at a place becomes greater, when the width of the corresponding opening in the stopper film is greater than those of other openings. On the other hand, the polishing depth D of the main magnetic pole at a place becomes smaller, when the width of the corresponding opening in the stopper film is smaller than those of other openings. Therefore, when the distribution of opening width W is set appropriately, the polishing depth can be set adequately for each place. Thus, the uniformity in thickness can be made higher in main magnetic poles after the polishing.

Preferably, the method further comprises, prior to the main laminate making step, a first preliminary laminate making step of: 1) forming a plurality of films or film portions to be polished onto a substrate; 2) covering each film portion to be polished with a first protective film; and 3) forming onto the first protective film a stopper film. The stopper film is harder to polish than the first protective film and each film portion to be polished, and is provided with openings having the same opening width at parts corresponding to places or locations of the films or portions to be polished, each opening being wider than a planar width of the corresponding film or portion to be polished, so as to make a first preliminary laminate. The method also includes, prior to the main laminate making step, a first preliminary polishing step of polishing the first protective film and film portions of the film to be processed through the openings of the stopper film in the preliminary laminate by a CMP method; and a thickness distribution acquiring step of acquiring a thickness distribution of the film portions to be polished after being polished by the first preliminary polishing step. The opening width distribution of the stopper film for the main laminate will be set in the main laminate making step according to the thickness distribution acquired from this preliminary laminate.

Thus, obtaining a thickness distribution of film portions to be processed from the results of the CMP in the first preliminary laminate, that includes a stopper film with a uniform opening width, and then providing a stopper film of the main laminate with an opening width distribution based on such results enable the following. Namely, for a film portion that needs to be polished more than other film portions based on the thickness distribution of the first preliminary laminate, the width of the corresponding opening in the main laminate can be made greater than those of other openings. On the other hand, for the film portion that needs to be polished less than other film portions based on the thickness distribution of the first preliminary laminate, the width of the corresponding opening in the main laminate can be made smaller than those of other openings. Thus, the polishing depth D in the main laminate corresponding to the film portion, that is to be polished more, can be made greater based on the thickness distribution of the first preliminary laminate. The polishing depth D in the main laminate corresponding to the film portion, that is to be polished less, can be made smaller based on the thickness distribution of the first preliminary laminate. Therefore, the uniformity in thickness of films to be polished in the main laminate after polishing can easily be improved.

When main laminates and first preliminary laminates are made by using the same film-forming apparatus, reproducibility often occurs in the unevenness in thickness of the main laminates and first preliminary laminates. Thus, films to be polished at the same place are likely to exhibit similar unevenness in thickness. Therefore, understanding the tendency of the film-forming apparatus beforehand according to the thickness distribution in the polished first preliminary laminate and providing the main laminate with an opening width distribution to correct the tendency can easily yield films or portions of films to be polished with a uniform thickness.

Preferably, the method further comprises, prior to the main laminate making step, a second preliminary laminate making step of: 1) forming a film to be polished onto a substrate, 2) covering the film to be polished with a first protective film, and 3) forming onto the first protective film a stopper film that is harder to polish than the first protective film and the film to be polished, and that is provided with an openings, each opening being wider than a planar width of a corresponding portion of the film to be polished. The openings have a width different from that in the stopper film of the first preliminary laminate, so as to make a second preliminary laminate. This method also includes, prior to the main laminate making step, 1) a second preliminary polishing step of polishing the first protective film and portions of the film to be processed by a CMP method through the openings of the stopper film in the second preliminary laminate; 2) a first polishing depth acquiring step of acquiring a polishing depth associated with the opening width of the first preliminary polishing laminate polished by the first preliminary polishing step; 3) a second polishing depth acquiring step of acquiring a polishing depth associated with the opening width of the second preliminary polishing laminate polished by the second preliminary polishing step; and 4) a correlation acquiring step of acquiring a correlation between polishing depth and opening width according to the polishing depths associated with the opening widths of the first and second preliminary laminates and the opening widths of the respective stopper films in the first and second preliminary laminates. The main laminate making step then acquires a set value for polishing depth to be realized in each opening of the stopper film in the main laminate according to the polishing depth and thickness distribution of the first preliminary laminate, and sets the opening width of the stopper film in the main laminate according to the set value and the correlation.

In this case, for each film to be processed, a set value of polishing depth D required for correcting fluctuations in thickness of films or film portions to be polished after polishing can be acquired according to the polishing depth and thickness distribution of the first preliminary laminate, and a set value of opening width W corresponding to the set value of polishing depth D can be obtained according to the correlation. Therefore, an optimal opening width W for each film or portion to be polished in the main laminate can be set more favorably.

In the main laminate and each preliminary laminate, the films or film portions to be processed may have the same planar form and the same planar size. The opening width of the stopper film may be the width extending along the direction across the width of each film or portion to be polished.

More specifically, the films or portions to be polished may each have an elongated rod-like part when seen as a plane. The openings of the stopper film may each have a slit corresponding to the rod-like part in each film to be polished, and the opening width of the stopper film may be the width of the slit.

Preferably, the main laminate making step further forms a second protective film, that is easier to polish than the stopper film, on the first protective film by way of the stopper film; and the main polishing step further polishes the second protective film by a CMP method.

Depending on the thickness of films or film portions to be polished and the like, the first protective film often has parts that project from the openings of the stopper film. In the case where no second protective film is provided, the polishing of the stopper film, that is exposed at the surface, advances to a certain extent when polishing the projected parts by CMP. Then, the films or portions to be polished and the like will be polished thereafter through the openings of the stopper film whose surface has been polished to a certain extent, which may adversely affect the uniformity in thickness of the films or film portions to be polished after polishing. However, providing the second protective film can substantially remove the projected part of the first protective film before the stopper film is exposed at the surface, whereby the inside of the opening can favorably be polished while keeping the thickness of the stopper film.

The films to be polished in the present invention are favorably used in magnetic poles in magnetic heads, thin-film magnetic heads in particular. This is because accuracy in thickness is required in magnetic poles of thin-film magnetic heads, magnetic poles of perpendicular magnetic recording heads in particular.

As mentioned above, the present invention provides a method of polishing a film to be polished, which can improve the uniformity in thickness of a plurality of films to be polished.

BRIEF DESCRIPTION OF THE DRAWINGS

FIG. 14 is a view concerning a second preliminary laminate 2b, in which (a) and (b) are partly broken plan views showing the second preliminary laminates 2b and 2c, respectively;

FIG. 19 is a view showing the first preliminary laminate 2a, second preliminary laminates 2b to 2e, and main laminate 1 in accordance with an example, in which (a) and (b) are a sectional view and a partly broken plan view, respectively;

FIG. 21 is a table showing the thickness and opening width of each layer at the measurement points of the first preliminary laminate 2a, and the thickness and opening width of each layer at the measurement points of the main laminate 1.

DETAILED DESCRIPTION OF EMBODIMENTS

The method of polishing a film to be polished in accordance with the present invention will now be explained. While the method of polishing a film to be polished in accordance with the present invention regulates a plurality of films or a plurality of portions in a patterned film to be polished so as to make the film attain as uniform a thickness as possible and may be widely employable in any field, a method of polishing a main magnetic pole of a perpendicular magnetic recording head within a thin-film magnetic head as a film to be polished will be explained here with reference to the drawings.

Figure 1:
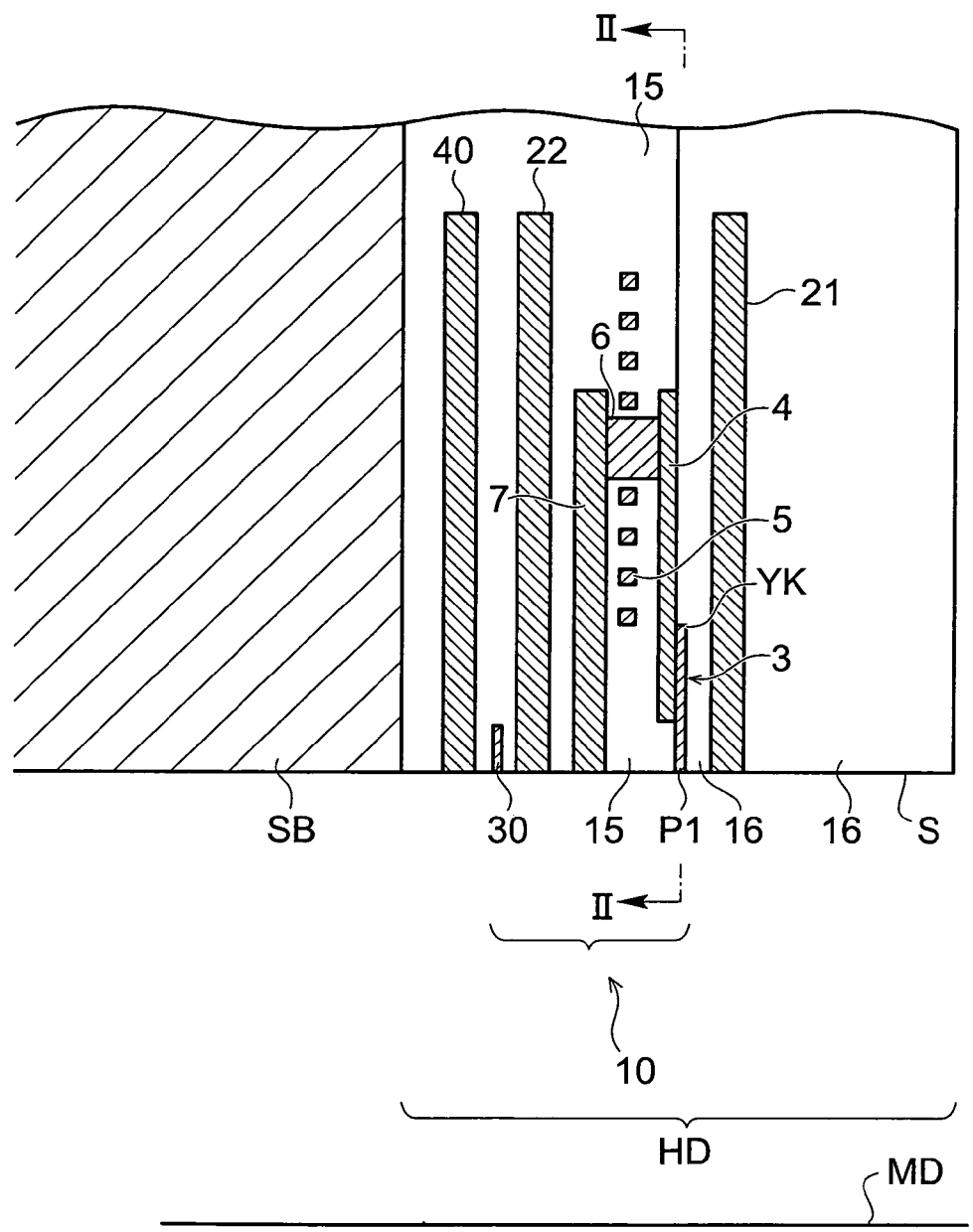
FIG. 1 is a schematic sectional view of a perpendicular recording magnetic head made in an embodiment.
Figure 2:
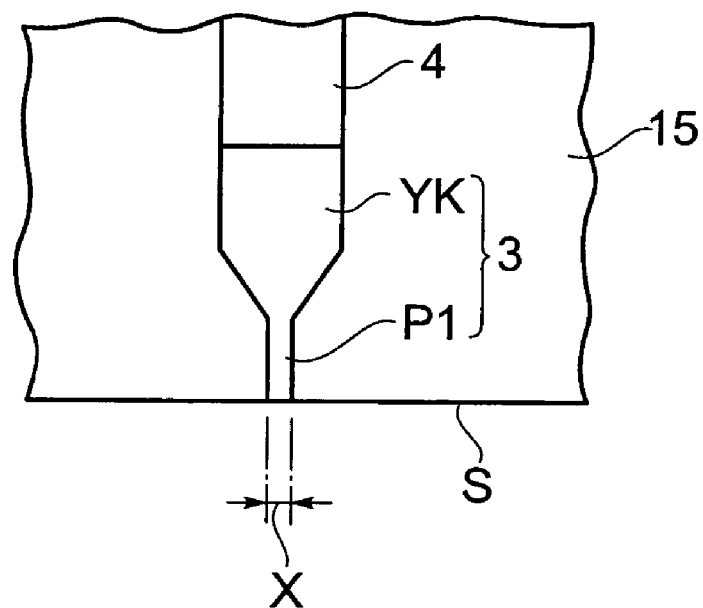
FIG. 2 is a front view of the recording magnetic pole film in the perpendicular recording magnetic head of FIG. 1.

FIG. 1 is a sectional view showing an example of perpendicular magnetic recording head, whereas FIG. 2 is a view taken along the line II-II of the perpendicular magnetic recording head in FIG. 1.

This perpendicular magnetic recording head HD is formed on a substrate SB made of AlTiC or the like. The surface on the lower side of FIG. 1 is an air bearing surface S opposing a magnetic disk MD.

The perpendicular magnetic recording head HD mainly comprises a writing part 10 and a reading part 30.

The writing part 10 mainly comprises a recording magnetic pole film 3, an auxiliary magnetic pole film 4, a return yoke film 7, a coil film 5, and a junction 6.

On the air bearing surface S side, as shown in FIG. 2, the recording magnetic pole film 3 includes a main magnetic pole P1 extending to the air bearing surface S while having a predetermined narrow width X, whereas a yoke part YK wider than the main magnetic pole P1 is connected thereto on the rear side. As shown in FIGS. 1 and 2, the main magnetic pole P1 has a leading end face located on the air bearing surface S. For example, the main magnetic pole P1 has the width X on the order of 10 to 200 nm, a length on the order of 10 to 200 nm, and a thickness on the order of 50 to 500 nm.

The auxiliary magnetic pole film 4 is disposed on the yoke part YK of the recording magnetic pole film 3 in contact therewith, and concentrates a magnetic flux onto the main magnetic pole P1 without magnetically saturating the yoke part YK.

The return yoke film 7 is disposed while being distanced from the recording magnetic pole film 3 and auxiliary magnetic pole film 4, and is magnetically coupled to the auxiliary magnetic pole film 4 by the junction 6 on the rear side with reference to the air bearing surface S.

Between the auxiliary magnetic pole film 4 and return yoke film 7, the coil film 5 is arranged so as to be wound spirally about the junction 6.

When a current is applied to the coil film 5, magnetic fluxes generated in the junction 6 upon electromagnetic induction are bundled by the main magnetic pole P1, so as to be released from the air bearing surface S to the outside and collected by the return yoke film 7 by way of the air bearing surface S thereof, thus returning to the junction 6. This performs recording with respect to the magnetic disk MD opposing the air bearing surface S.

Materials of the recording magnetic pole film 3, auxiliary magnetic pole film 4, return yoke film 7, and junction 6 are magnetic materials, for which NiFe and the like can be used, for example.

Such a writing part 10 is magnetically shielded by being held between a first shield film 21 and a second shield film 22 which are made of a magnetic material such as NiFe.

The reading part 30 is a known reading device, for which a GMR device, a TMR device, or the like can be used, for example. The reading part 30 is magnetically shielded by the second shield film 22 and a third shield film 40 made of a magnetic material such as NiFe.

The perpendicular magnetic recording head HD further comprises an insulating film 15 for burying therein the third shield film 40, the reading part 30, the second shield film 22, and the writing part 10 except for the recording magnetic pole film 3, and an insulating film 16 for burying therein the recording magnetic pole film 3 and the first shield film 21. The insulating films 15, 16 are made of a metal oxide such as alumina or an insulating material such as an organic insulating material, for example.

Manufacturing Method

Figure 3:
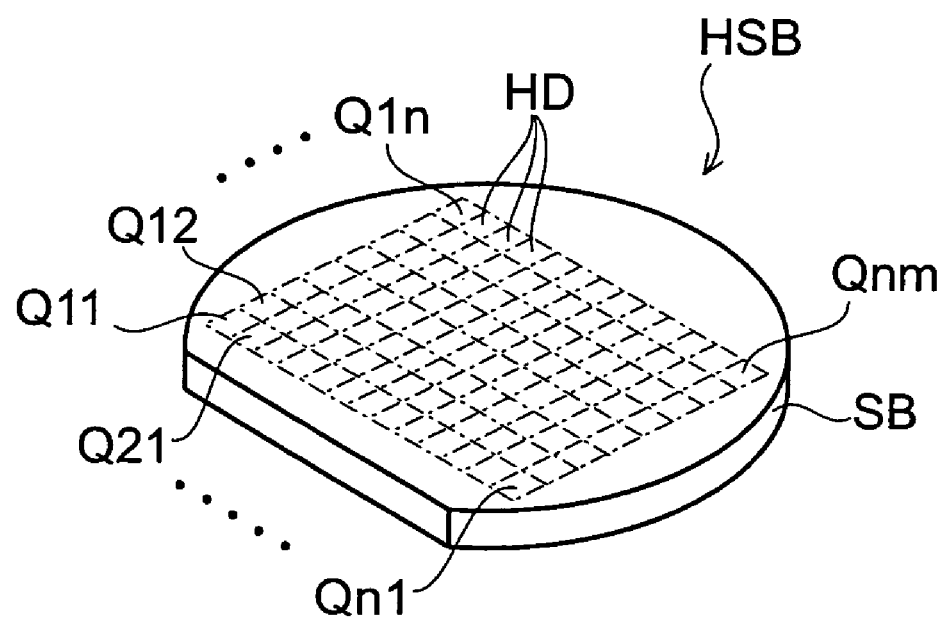
FIG. 3 is a schematic view showing a state where a number of perpendicular recording magnetic heads are formed in a matrix on a substrate.

A method of manufacturing such a perpendicular magnetic recording head will now be explained. Here, for example, several hundreds of such perpendicular magnetic recording heads HD are simultaneously formed in a matrix on the same substrate SB as shown in FIG. 3. Specifically, on the substrate SB, the perpendicular magnetic recording heads HD are formed in a matrix of n rows by m columns in individual head forming parts Q11 to Qnm, respectively, so as to yield a head substrate HSB. Here, it is necessary for the main magnetic poles P1 in the perpendicular magnetic recording heads HD to have as uniform and predetermined a thickness as possible.

In this embodiment, the main magnetic poles P1 are collectively polished by a CMP method using a stopper film, so as to make them attain a predetermined thickness. Specifically, CMP for a first preliminary laminate, CMP for a second preliminary laminate, and setting of an opening width of a stopper film are carried out in a preparatory step to begin with. Thereafter, CMP for a main laminate is performed in a main step with thus obtained opening width.

They will now be explained specifically.

Preparatory Step

To begin with, a first preliminary laminate 2a is prepared.

Figure 4:
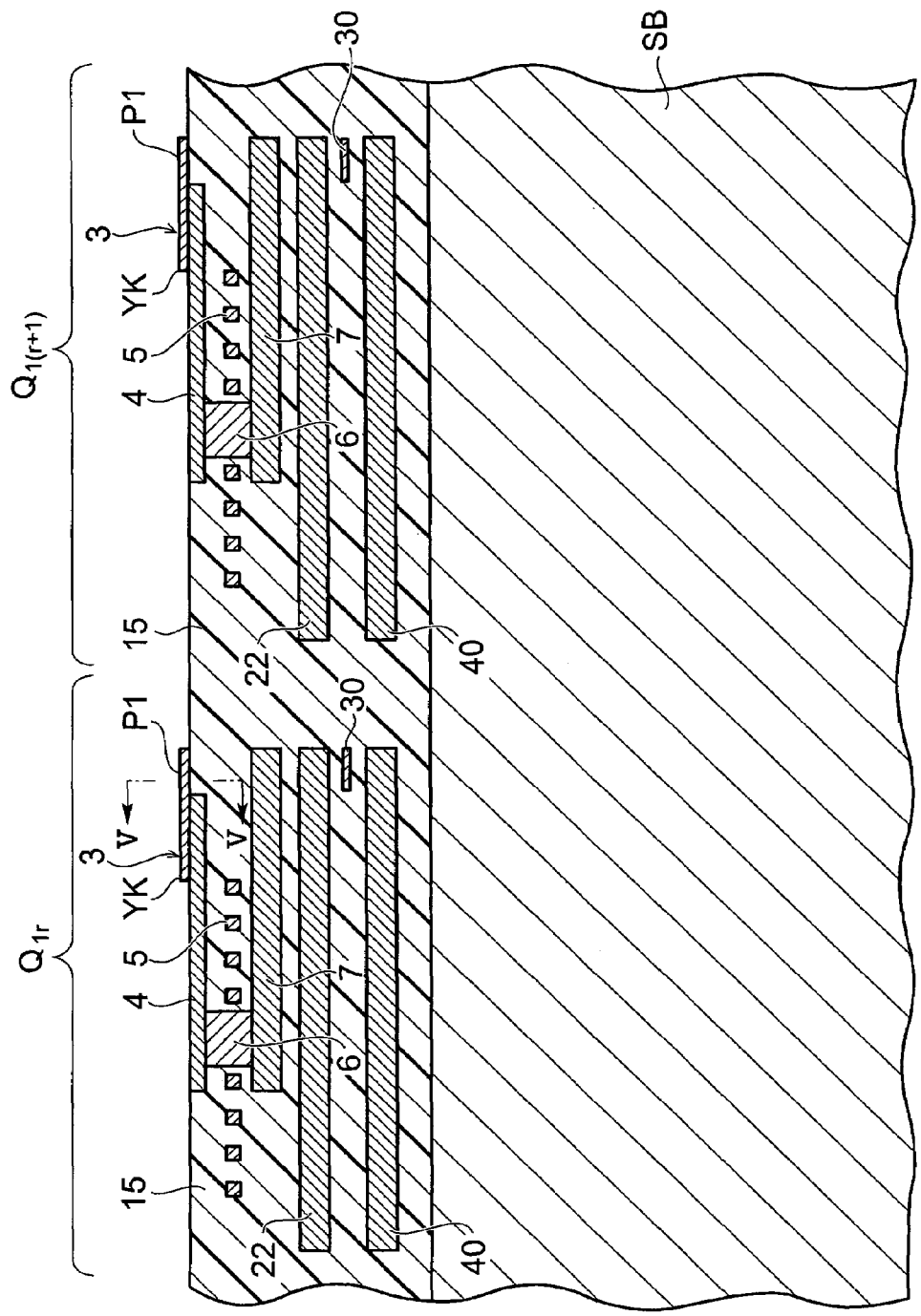
FIG. 4 is a schematic view showing a state where various layers are laminated on the substrate of FIG. 3.

Specifically, as shown in FIG. 4, each head forming part Q on the substrate SB is initially formed in the matrix pattern shown in FIG. 3 with a third shield film 40, a reading part 30, a second shield film 22, a return yoke film 7, a junction 6, a coil film 5, an auxiliary magnetic pole film 4, and an insulating film 15 burying them. Subsequently, surfaces of the insulating film 15 and auxiliary magnetic pole film 4 are flattened by a CMP method or the like. This step will not be explained in detail, since it can be performed by a known film-forming method such as sputtering or a known patterning method such as photolithography.

Figure 5:
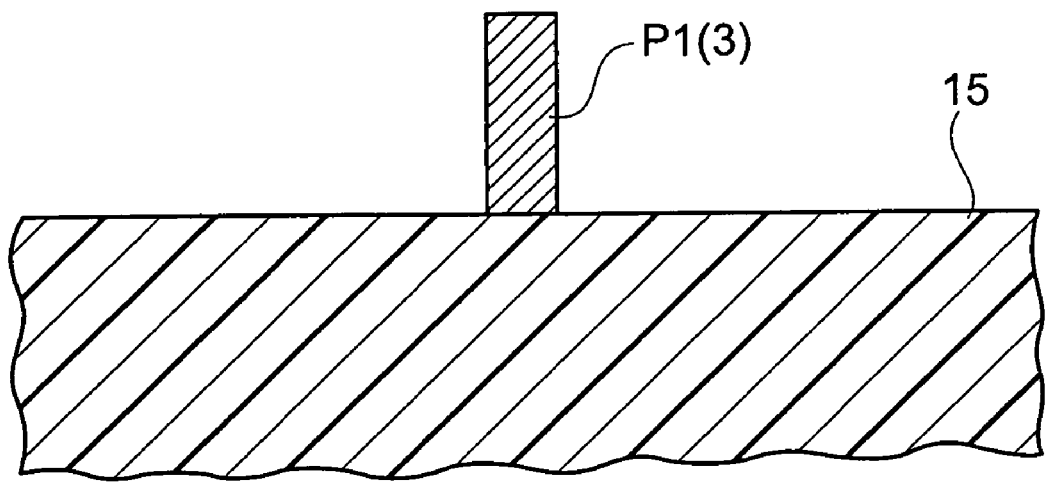
FIG. 5 is a schematic view taken along the line V-V of FIG. 4.

Then, a recording magnetic pole film 3, that is a discrete portion of the patterned recording magnetic pole film, is formed in the matrix pattern shown in FIG. 3 on the insulating film 15 and auxiliary magnetic pole film 4 of each head forming part Q. As shown in FIG. 2 mentioned above, the recording magnetic pole film 3 has a planar form comprising an elongated rectangular main magnetic pole P1 having a width X and a yoke part YK expanding on its rear side. The recording magnetic pole films 3, the main magnetic poles P1 in particular, have the same planar form and planar size. Such a recording magnetic pole film 3 can easily be formed by frame plating with a soft magnetic material using a resist frame patterned by lithography or the like as a mold. Here, the main magnetic pole P1 of the recording magnetic pole film 3 becomes a film to be polished. FIG. 5 shows a sectional view taken along the line V-V of FIG. 4.

Figure 6:
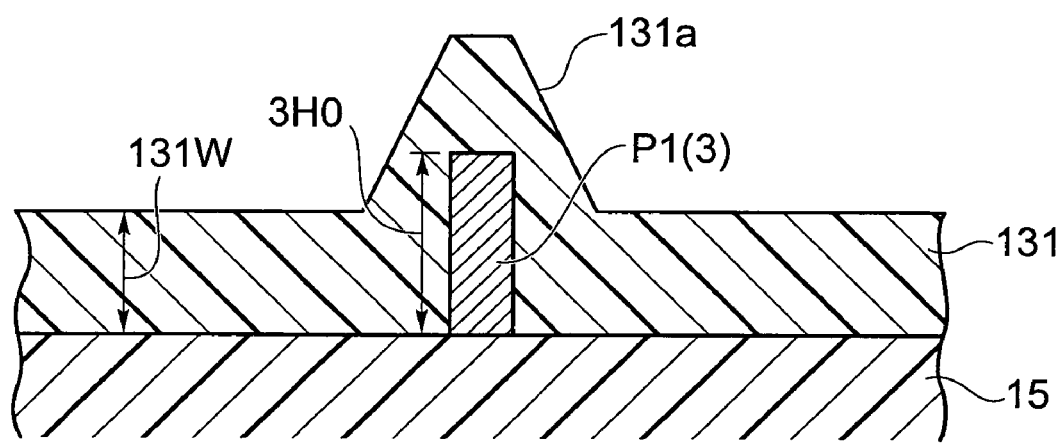
FIG. 6 is a schematic sectional view subsequent to FIG. 5.

Subsequently, as shown in FIG. 6, the first protective film 131 is laminated on the whole surface of the insulating film 15 so as to cover the recording magnetic pole film 3 by a method such as sputtering.

In the first protective film 131, the part corresponding to the main magnetic pole P1 is formed with a projection 131a. Though not depicted, the yoke part YK is covered with the first protective film 131, so that a projection 131a is similarly formed.

The first protective film (flattening film) 131 is formed from an insulating nonmagnetic material such as alumina or silica. The thickness 131W of the first protective film 131 is preferably smaller than that of the recording magnetic pole film 3 as shown in FIG. 6 but may be on the par with the thickness 3H0 of the recording magnetic pole film 3.

Figure 7:
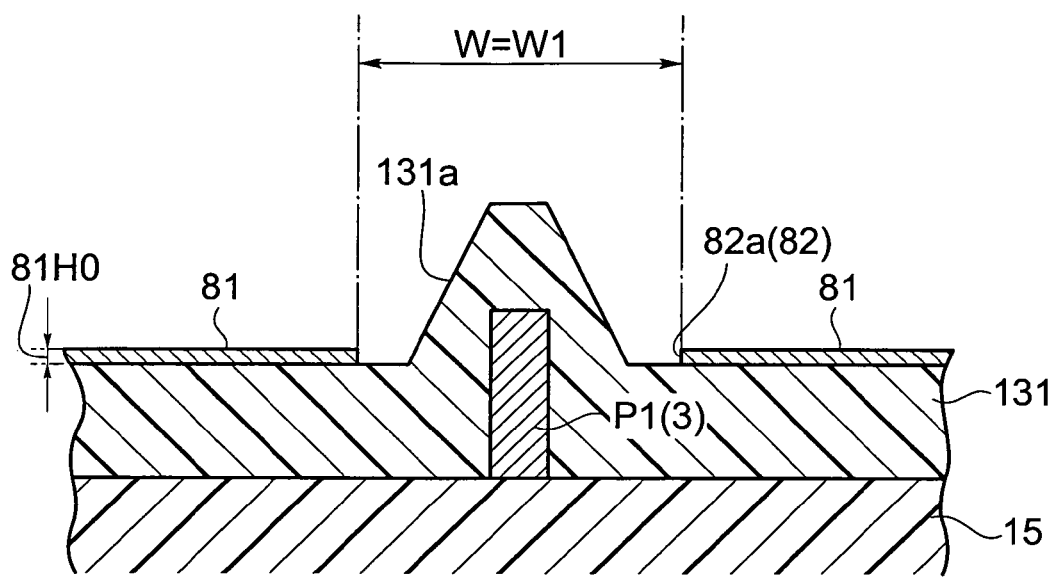
FIG. 7 is a schematic sectional view subsequent to FIG. 6.
Figure 8:
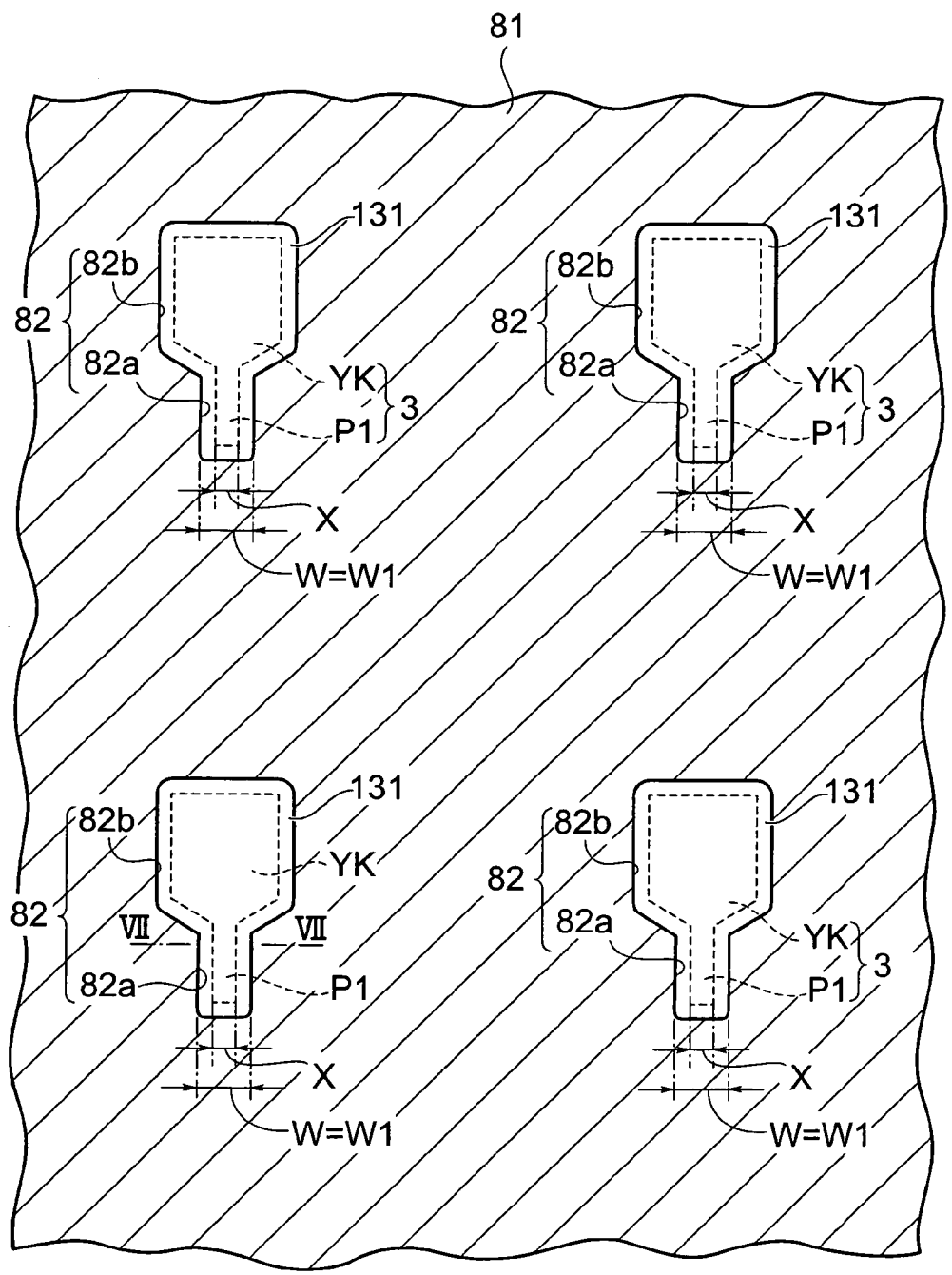
FIG. 8 is a plan view of the substrate of FIG. 7.

Subsequently, as shown in FIGS. 7 and 8, a stopper film 81 is formed on the first protective film 131. The stopper film 81 has openings 82, each greater than the planar form of its corresponding recording magnetic pole film 3, among the discretely patterned portions of the recording magnetic pole film, at respective parts opposing the recording magnetic pole films 3. The material of the stopper film 81 is harder to polish than the first protective film 131, a second protective film 132 which will be explained later, and the recording magnetic pole film 3 in a CMP step which will be explained later. For example, a metal material such as Ta, Ti, or TiN can be used therefor. Though not restricted in particular, the thickness 81H0 of the stopper film 81 can be on the order of 50 to 300 nm, for example.

Specifically, as shown in FIG. 8, each opening 82 of the stopper film 81 has a form in which a wider part 82b having a greater width corresponding to the yoke part YK and a slit part 82a having a thin form corresponding to the main magnetic pole P1 are combined together.

Here, the opening width W of the stopper film 81 is the width W of the slit part 82a. As shown in FIG. 8, the values of opening width W in the stopper film 81 are the same, i.e., W1.

As shown in FIG. 7, the opening 82 of the stopper film 81 has such a size that the stopper film 81 does not overlap on the projections 131a of the first protective film 131. Further, as shown in FIG. 8, positions of the openings 82 are set such that each discrete portion of the recording magnetic pole film 3 is disposed at the center of its corresponding opening 82 when the openings 82 are seen from above. Specifically, for example, the main magnetic pole P1 is arranged at the center in the direction of width W of the slit part 82a.

Figure 9:
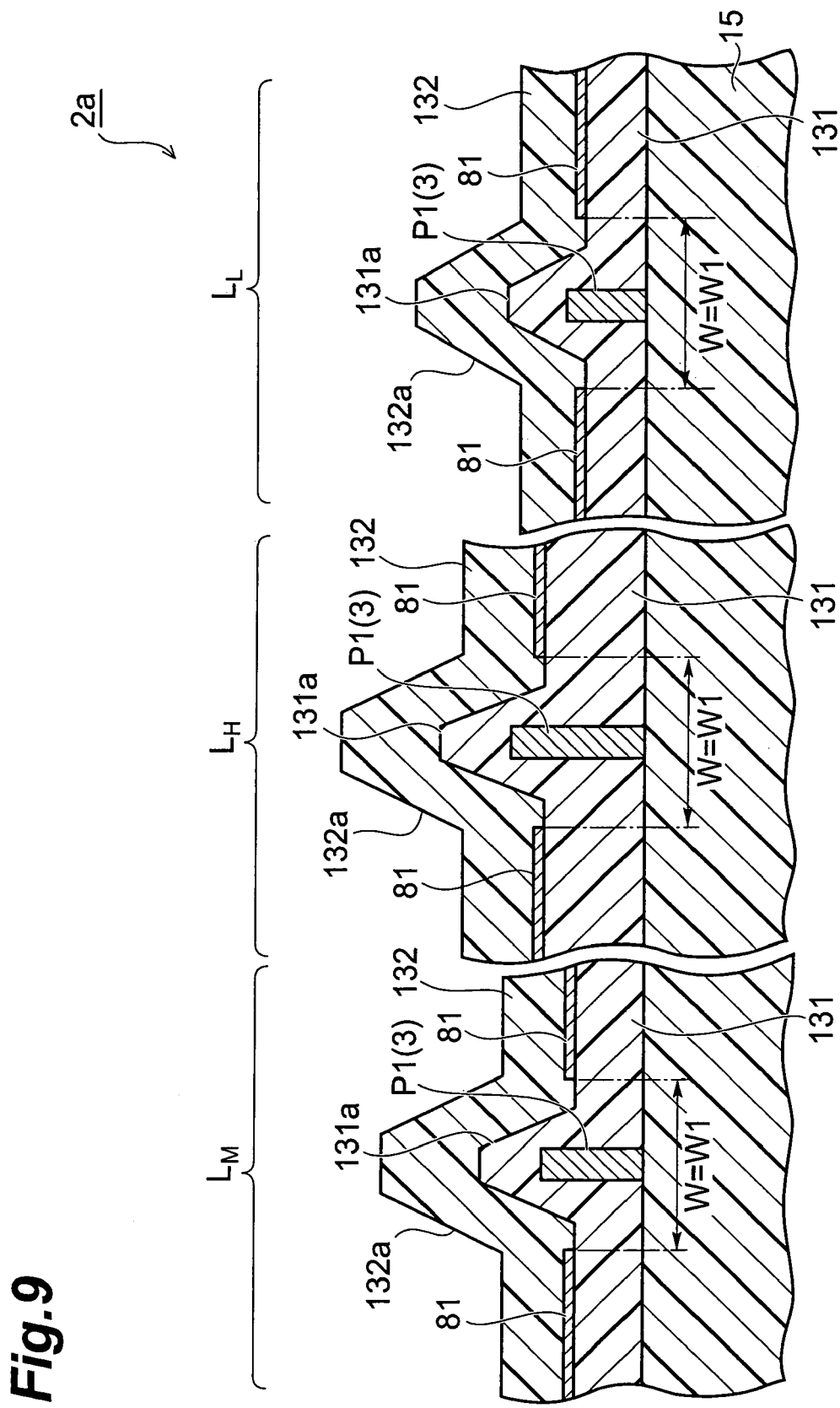
FIG. 9 is a schematic sectional view of the substrate subsequent to FIG. 7.

Next, as shown in FIG. 9, a second protective film (flattening film) 132 is laminated on the first protective film 131 by way of the stopper film 81 over these exemplary discrete portions of the matrix pattern of the recording magnetic pole film. For the second protective film 132, a material easier to polish than the stopper film 81 by the CMP method, i.e., any of the materials listed as the material of the first protective film 131, can be employed. In particular, the same material as that of the first protective film 131 is preferably used.

Here, the second protective film 132 is also formed with projections 132a corresponding to the projections 131a of the first protective film. This completes the first preliminary laminate 2a.

Depending on characteristics of film-forming apparatus, experimental conditions, and the like, fluctuations in thickness are likely to occur in the recording magnetic pole films 3, stopper film 81, first protective film 131, and second protective film 132 on the substrate in the first preliminary laminate 2a. When such laminates are made by the same film-forming apparatus, reproducibility is likely to occur in fluctuations in the film-forming thickness among the laminates. Namely, the thickness often becomes greater and smaller at respective fixed locations.

Specifically, for example, each film tends to be formed thicker in a region $L_H$ than in a region $L_M$ in the first preliminary laminate 2a in this embodiment. On the other hand, each film tends to be formed thinner in a region $L_L$ than in the region $L_M$ in the first preliminary laminate 2a.

Subsequently, the whole surface of the first preliminary laminate 2a is polished by the CMP method. The CMP method is carried out by pressing a surface to be polished against a rotating polishing pad and supplying a slurried polishing agent to this polishing surface. The polishing agent contains particles such as alumina and silica capable of a mechanical polishing action, and an oxidizing agent capable of a chemical polishing action, so that the CMP method performs mechanical and chemical polishing actions.

Figure 10:
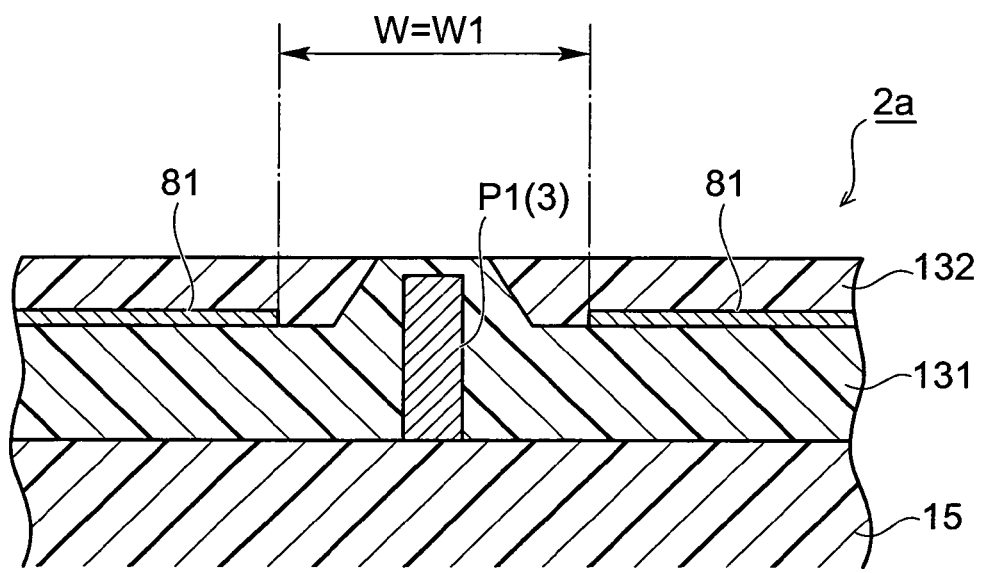
FIG. 10 is a schematic sectional view subsequent to FIG. 9.

Consequently, as shown in FIG. 10, the projections 131a of the first protective film 131 and the projections 132a of the second protective film 132 are initially polished, so that the surface of the first preliminary laminate 2a becomes flat.

Figure 11:
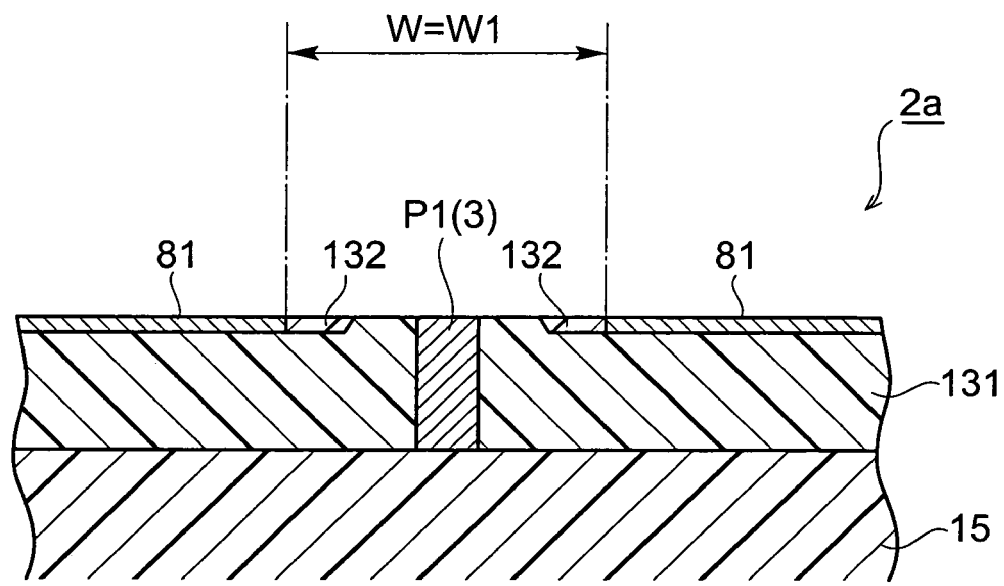
FIG. 11 is a schematic sectional view subsequent to FIG. 10.

When the CMP continues further, the stopper film 81 is exposed at the surface as shown in FIG. 11.

Figure 12:
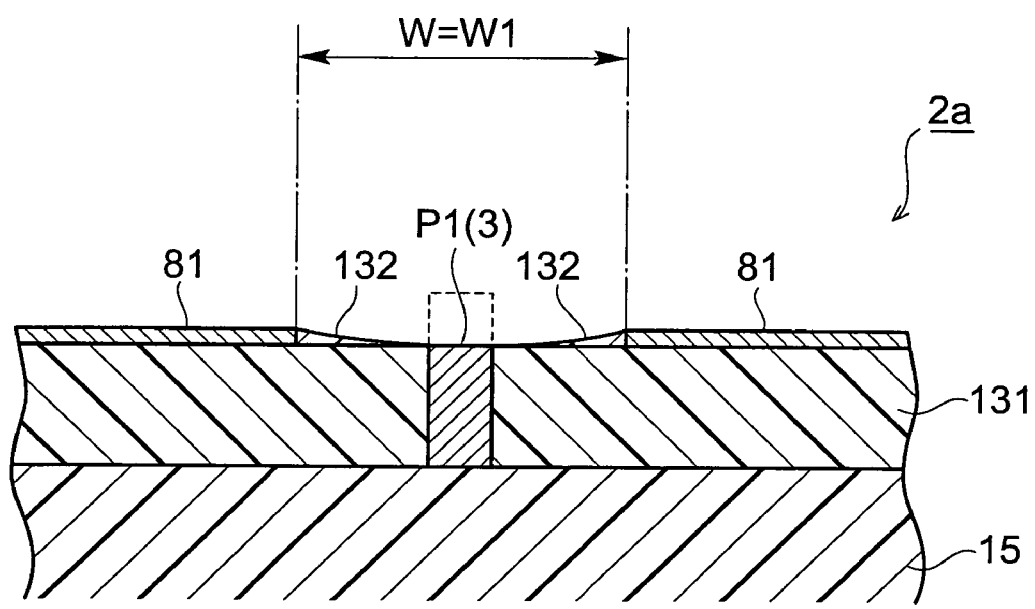
FIG. 12 is a schematic sectional view subsequent to FIG. 11.

Since the stopper film 81 is harder to polish than the first protective film 131, second protective film 132, and recording magnetic pole film 3, the polishing surface advancing speed varies between the part on the stopper film 81 and the inside of the openings 82 in the stopper film 81 as shown in FIG. 12 when the CMP continues further. Specifically, as shown in FIG. 12, the stopper film 81 itself is not polished so much, whereas polishing advances more in the first protective film 131, second protective film 132, and main magnetic poles P1 (recording magnetic pole films 3) within the openings 82 of the stopper 81 than on the surface of the stopper film 81. This forms a downward-convex polished surface within each opening 82 of the stopper film 81.

Figure 13:
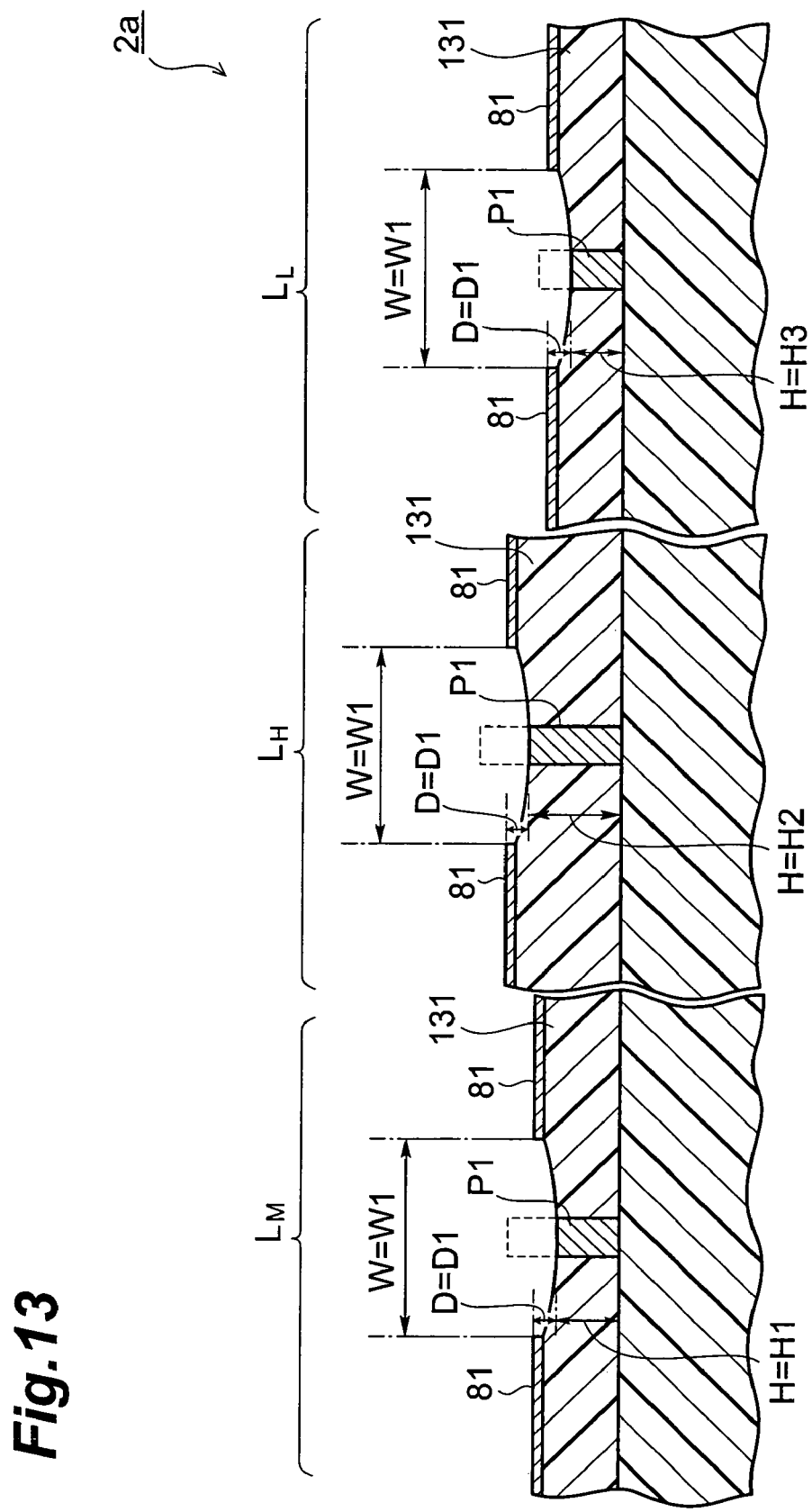
FIG. 13 is a schematic sectional view subsequent to FIG. 12.

When the polishing advances for a predetermined time, the polished surface is substantially stabilized in a state shown in FIG. 13. Here, the distance from the upper face of the stopper film 81 to the center part in the polished surface within each opening 82, i.e., the upper face of the main magnetic pole P1, is defined as polishing depth D. Then, the polishing depth D attains substantially the same value D1 in the first preliminary laminate 2a, since the opening width W of the stopper film 81 is always W1. However, the thickness of the first protective film 131 and the like fluctuate on the substrate SB, so that the thickness H of the main magnetic poles P1 at different portions of the recording magnetic pole film 3 varies among H1, H2, and H3, for example.

In the first preliminary laminate 2a, the thickness H1, H2, or the like of each main magnetic pole P1, i.e., a thickness distribution of the main magnetic poles P1, is measured by cross-sectional microscopic observations or the like. Also, the polishing depth D1 is obtained.

According to thus obtained results, it is seen at which the polishing depth D of each main magnetic pole P1 is set in order to polish a laminate (main laminate to be explained later) whose thickness is uneven as in the first preliminary laminate 2a with polishing by the CMP method such that the main magnetic poles P1 attain a uniform thickness. In order for the main magnetic pole P1 to have a thickness H1, for example, the polishing depth D is set to a value of D1+(H3−H1) at the location $L_L$, and a value of D1+(H2−H1) at the location $L_H$.

Subsequently, as shown in FIG. 14, a second preliminary laminate 2b is made by the same method and apparatus as those in the first preliminary laminate 2a except that the opening width W of each of the openings 82 in the stopper film 81 is W2 which is greater than W1, whereas a second preliminary laminate 2c is made by the same method and apparatus as those in the first preliminary laminate 2a except that the opening width W of each of the openings 82 in the stopper film 81 is W3 which is smaller than W1. Here, the recording magnetic pole film 3, first protective film 131, stopper film 81, and second protective film 132 have substantially the same unevenness at each location on the substrate. Then, the second preliminary laminates 2b, 2c are polished by the CMP method as with the first preliminary laminate 2a.

Figure 15:
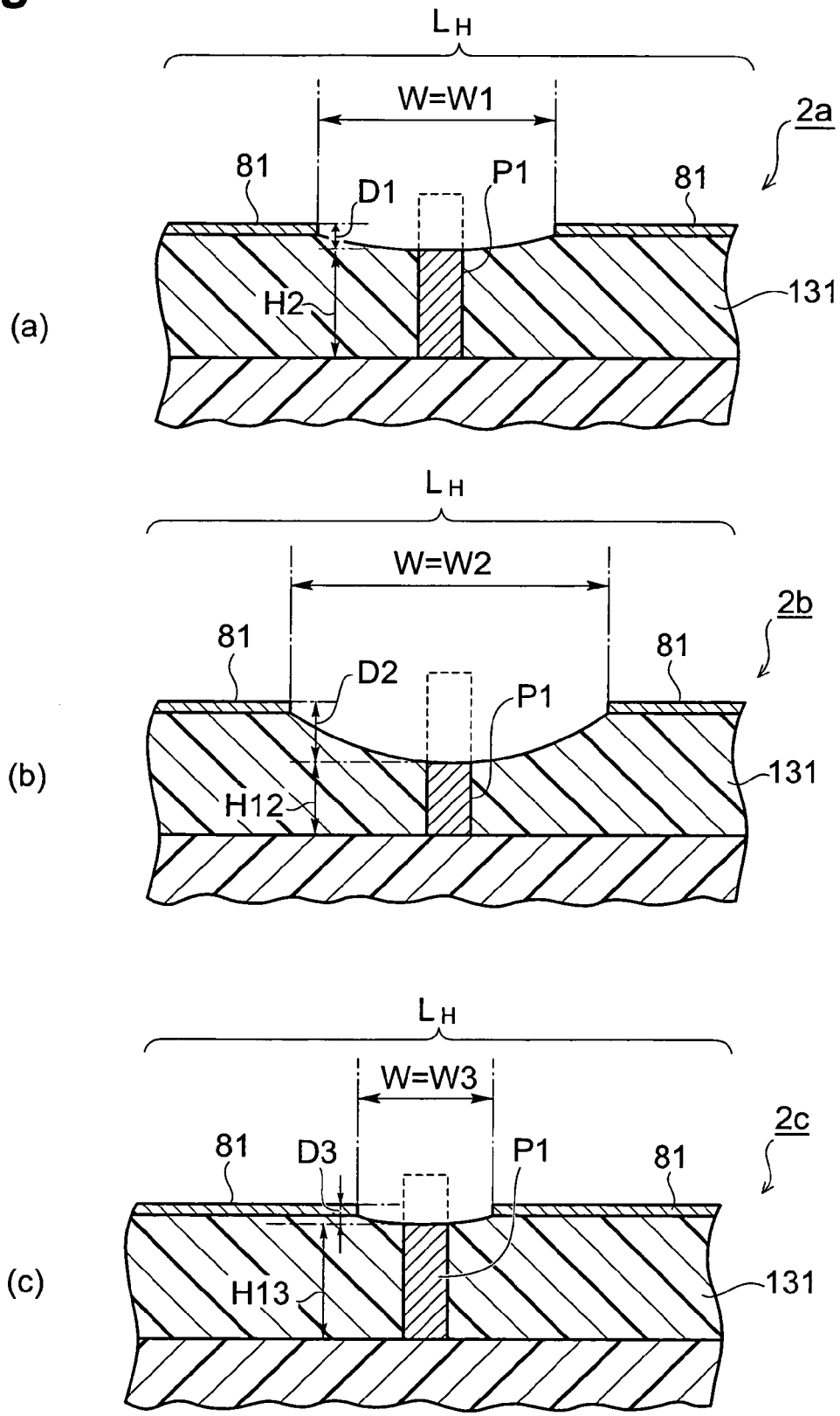
FIG. 15 is a schematic sectional view of laminates, in which (a), (b), and (c) are schematic sectional views of the first preliminary laminate 2a, second preliminary laminate 2b, and second preliminary laminate 2c, respectively, at the same location $L_H$ after polishing.

In FIG. 15, (a), (b), and (c) are schematic sectional views of the first preliminary laminate 2a and second preliminary laminates 2b, 2c, respectively, at the same location $L_H$ after the CMP.

At a predetermined location $L_H$, with reference to the first preliminary laminate 2a in which the opening width W of the stopper film 81 is W1 as shown in (a) of FIG. 15, for example, the polishing depth D becomes D2 which is greater than D1 in the case where the opening width W of the stopper film 81 is W2 which is greater than W1 as in the second preliminary laminate 2b shown in (b) of FIG. 15, whereby the thickness of the main magnetic pole P1 becomes H12 which is smaller than H2. Also, at the predetermined location $L_H$, the polishing depth D becomes D3 which is smaller than D1 in the case where the opening width W of the stopper film 81 is W3 which is greater than W1 as in the second preliminary laminate 2c shown in (c) of FIG. 15, whereby the thickness of the main magnetic pole P1 becomes H13 which is greater than H2.

Then, a plurality of opening widths W1, W2, W3 and a plurality of polishing depths D1, D2, D3 are obtained by electronic microscopic observations or the like, and their correlation is determined. Specifically, for example, a regression equation between W and D is acquired as a correlation. According to this correlation, it is seen at which the opening width W is set in order to yield a predetermined polishing depth D.

Therefore, according to the thickness distribution and polishing depth D of the first preliminary laminate 2a after polishing, a set value of the polishing depth D for each main magnetic pole to be realized in order for the main magnetic pole P1 to attain as uniform a thickness as possible at each location of the substrate can be obtained. According to this set value and the above-mentioned correlation, set values such as W21, W22, W23, and W24, for example, of the opening width W of the stopper film 81 necessary for attaining the set value of polishing depth D are determined.

Main Step

Figure 16:
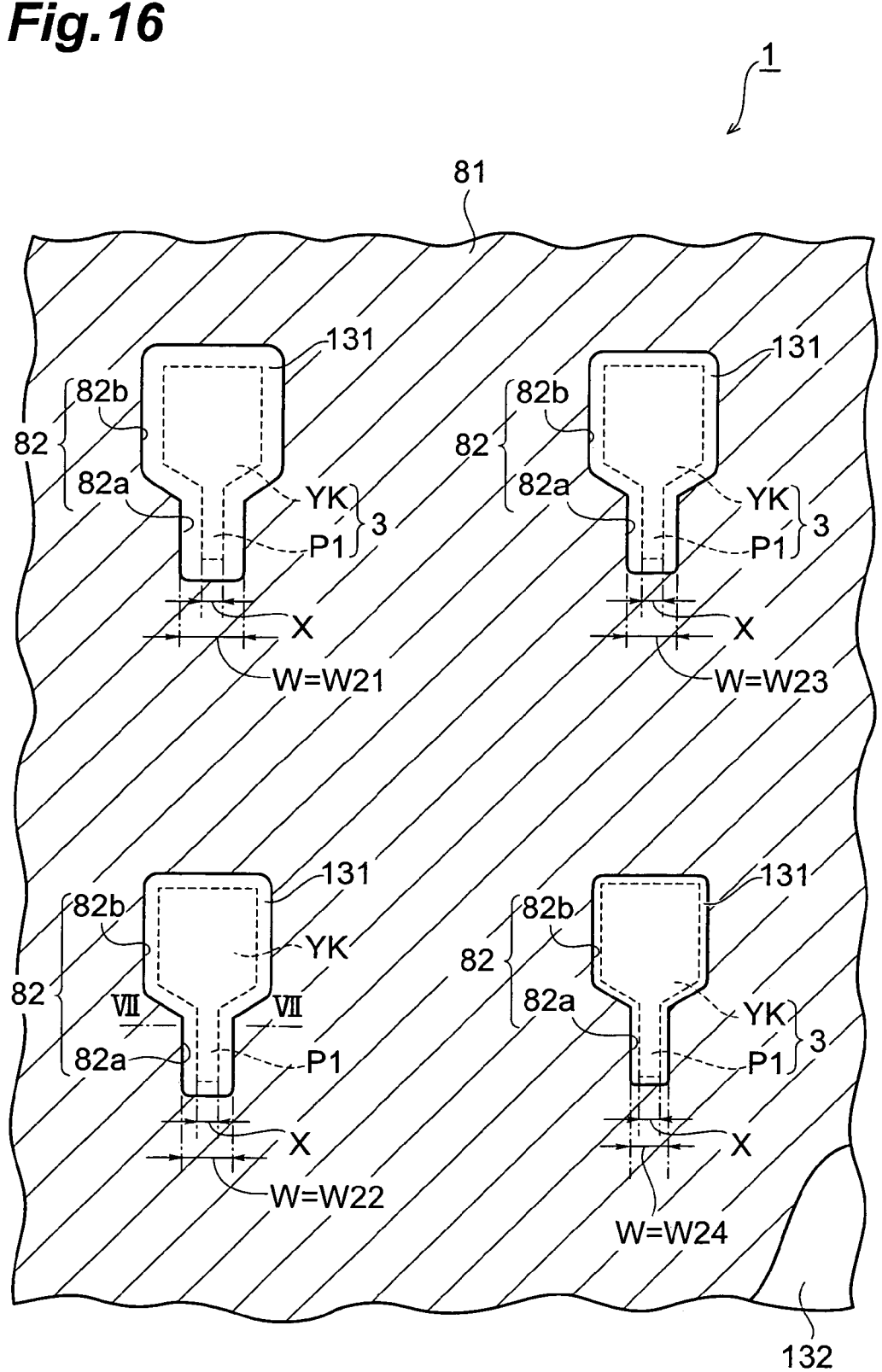
FIG. 16 is a partly broken plan view of a main laminate 1.
Figure 17:
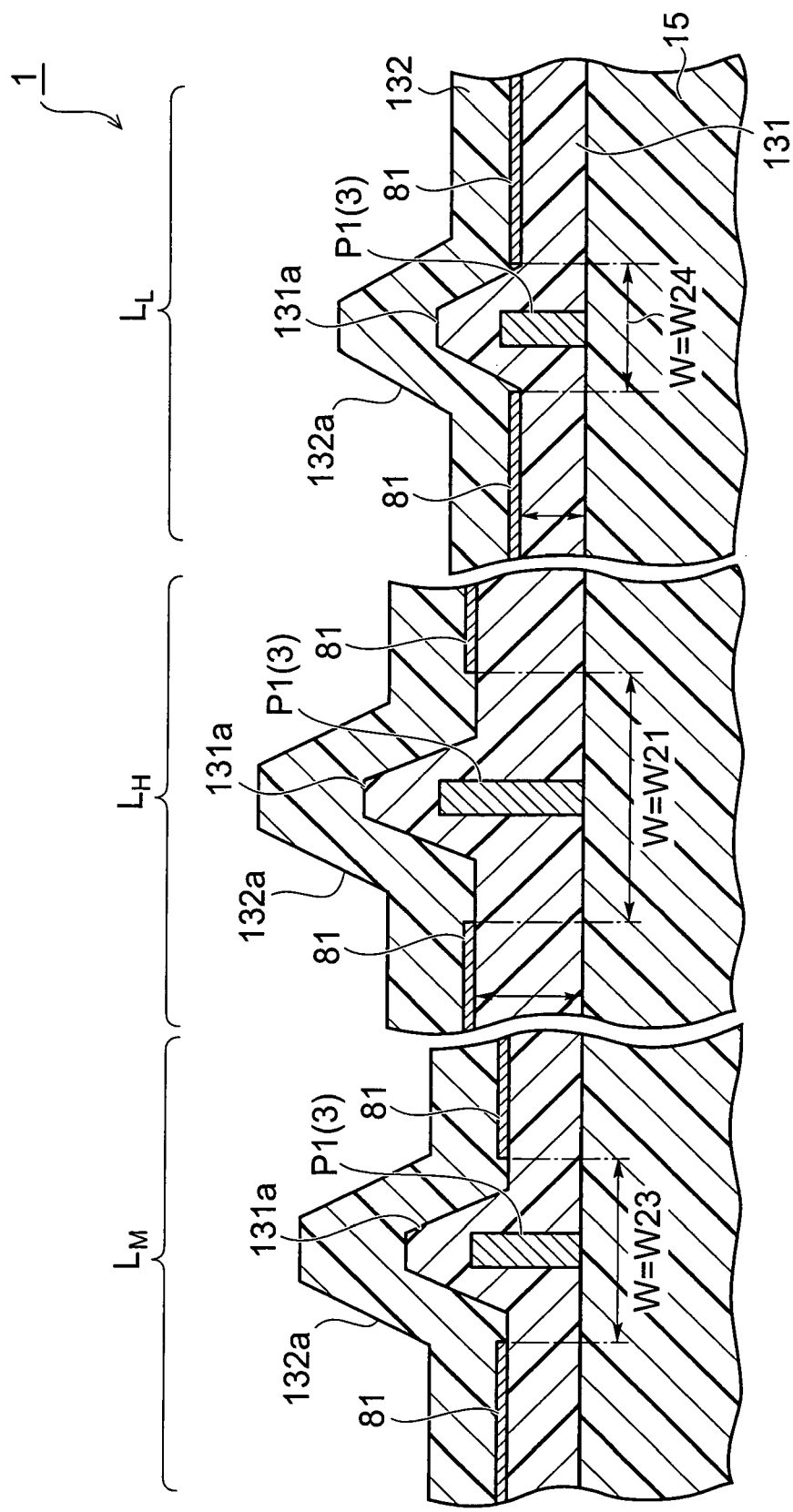
FIG. 17 is a schematic sectional view of the main laminate 1 in FIG. 16.

Subsequently, a main step is carried out. In this step, a main laminate 1 is made as with the first preliminary laminate 2a except that a predetermined distribution is provided in the opening width W of the openings 82 in the stopper film 81 as shown in FIGS. 16 and 17.

Here, the opening width W is W21, W22, W23, W24, and the like determined according to the thickness distribution and polishing depth D of the first preliminary laminate 2a as mentioned above, whereby the opening width W is provided with a predetermined distribution. This main laminate 1 is polished by the CMP method as with the first preliminary laminate 2a.

Figure 18:
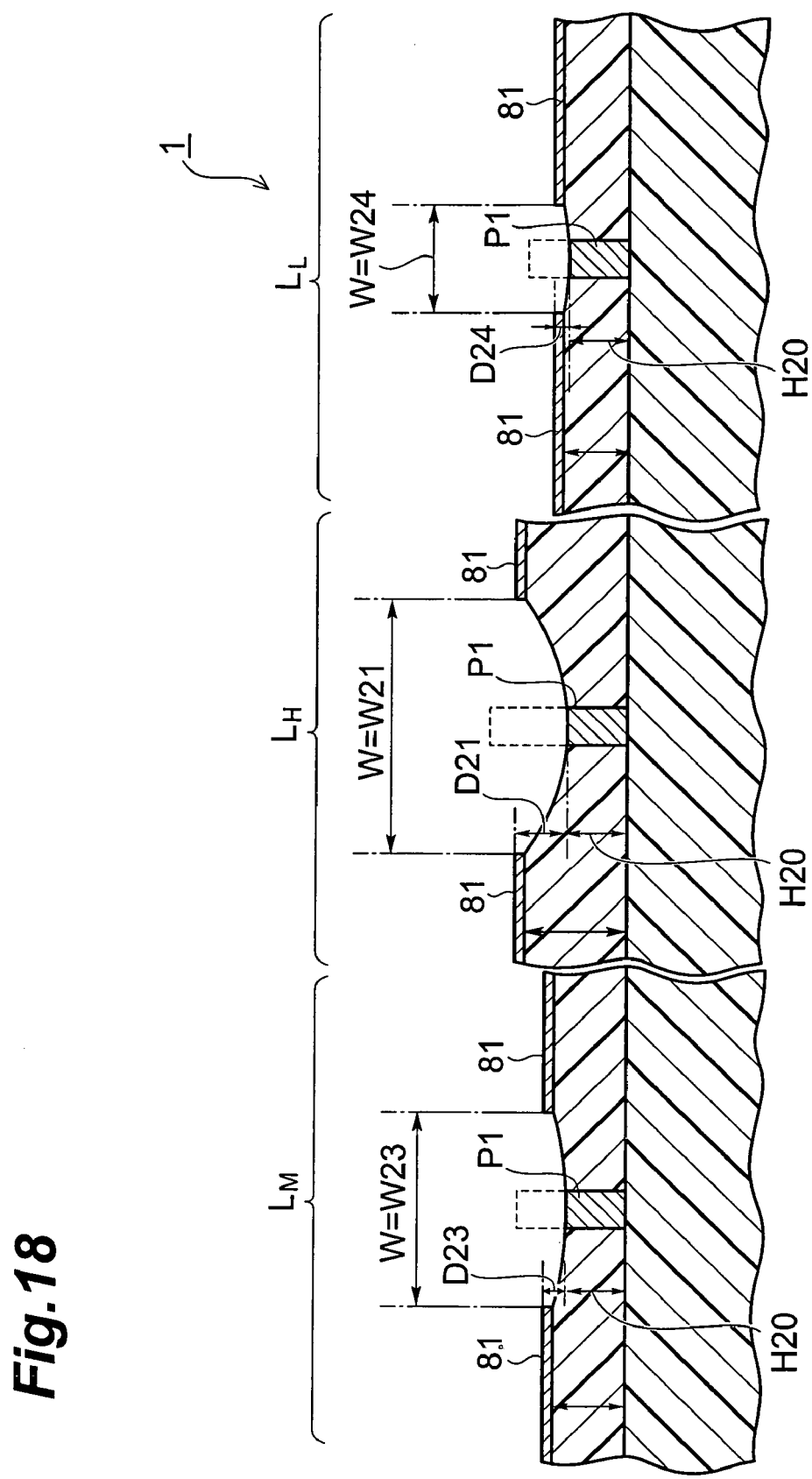
FIG. 18 is a schematic sectional view of the main laminate 1 in FIG. 17 after CMP.

Then, since the opening width W is provided with an appropriate distribution of W21, W23, W24, and the like as shown in FIG. 18 based on different locations or positions that correspond to the locations or positions of the discrete portions of the patterned recording magnetic pole film, appropriate polishing depths D21, D23, D24, and the like are achieved in the respective main magnetic poles P1, whereby the main magnetic poles P1 attain substantially the same value H20 of thickness.

After the recording magnetic pole films 3 are thus polished, the stopper film 81 is peeled off as necessary, and then a first shield film 21 and an insulating film 16 are laminated by a known method, whereby a head substrate HSB is completed.

Thus, this embodiment provides the opening width W of the stopper film 81 with a distribution when making the main laminate 1. Therefore, the polishing depth D of the main magnetic pole P1 can be made greater and smaller at locations where the opening width W is greater and smaller, respectively, than in their surrounding openings. As a consequence, the main magnetic poles P1 can attain a higher uniformity in thickness by appropriately setting the distribution of opening width W.

Before making the main laminate 1, this embodiment makes the first preliminary laminate 2a as with the main laminate 1 except that the opening width W is made uniform, polishes the first protective film 131 and main magnetic pole P1 by the CMP method through each opening 82 of the stopper film 81 in the first preliminary laminate 2a, acquires a thickness distribution of the main magnetic poles P1 after polishing, and sets the opening width W of the stopper film 81 in the main laminate 1 according to the thickness distribution. Therefore, the magnitude of polishing depth D required for attaining a uniform predetermined thickness in the main magnetic poles P1 in the main laminate 1 after polishing can favorably be estimated according to the thickness distribution, which makes it easier to set the opening width W of the stopper film 81 in the main laminate 1.

When the main laminate 1 and second preliminary laminates 2b, 2c are made by using the same film-forming apparatus as in this embodiment, the unevenness in the main magnetic pole P1, first protective film 131, and the like is likely to be common among the laminates, i.e., reproducibility is often seen in the unevenness. In other words, the films are likely to exhibit similar unevenness in thickness at the same location among the laminates. The location on the substrate can easily be identified with reference to an orientation flat, for example. Therefore, the main magnetic poles P1 having a uniform thickness can easily be obtained by grasping a film-forming habit according to the thickness distribution beforehand and providing the opening width W of the main laminate 1 with such a distribution as to correct the habit.

Before making the main laminate 1, the second preliminary laminate 2b having a uniform opening width W similar to the first preliminary laminate 2a except that the opening width W differs from that of the stopper film 81 in the first preliminary laminate 2a, and the like are made, and the first protective film and the film to be polished are polished by the CMP method through the openings 82 of the stopper film in the second preliminary laminate 2b and the like, the correlation between the polishing depth D and opening width W is obtained according to the polishing depth D of each main magnetic pole P1 in the first preliminary laminate 2a, second preliminary laminate 2b, and the like after polishing and the opening width W of the stopper film in the first preliminary laminate 2a, second preliminary laminate 2b, and the like, and the opening width W of the stopper film 81 in the main laminate 1 is set according to the thickness distribution and correlation.

In this case, the polishing depth D required for the main magnetic poles P1 to attain a uniform thickness can be acquired at each location according to the thickness distribution of the first preliminary laminate 2a, and a set value of opening width W corresponding to the polishing depth D can be obtained according to the correlation. Therefore, the opening width W of the stopper film 81 in the main laminate 1 can be set more favorably.

The second protective film 132 easier to polish than the stopper film 81 is formed on the first protective film 131 by way of the stopper film 81 in the main laminate making step, and is polished by the CMP method in the main polishing step.

Depending on the thickness or the like of the main magnetic poles P1, which are films to be polished, the first protective film 131 often projects from the openings 82 of the stopper film 81. Without the second protective film 132, the polishing of the stopper film 81 exposed at the surface advances to a certain extent when polishing the projections 131a by CMP, while the amount of polishing the stopper film 81 tends to become uneven. This may adversely affect the uniformity in thickness of the main magnetic poles P1 after polishing. However, providing the second protective film 132 can substantially remove the projections 131a of the first protective film 131 before the stopper film 81 is exposed at the surface, whereby the inside of the openings 82 can favorably be polished by the CMP while keeping the thickness of the stopper film 81.

Without being restricted to the above-mentioned embodiment, the present invention can be modified in various manners.

For example, though both of the first preliminary laminate 2a and second preliminary laminate 2b, 2c, or the like are made in the above-mentioned embodiment, the present invention can be embodied such that the first preliminary laminate 2a is made alone without the second preliminary laminate 2b, 2c, or the like, while the opening width W of the main laminate 1 is adjusted according to a thickness distribution of the first preliminary laminate 2a.

The above-mentioned embodiment makes a thickness distribution by preparing the first preliminary laminate 2a having a uniform opening width W. However, without making the thickness distribution, at least one of thickness distributions of the first protective film, stopper film, and film to be polished in the main laminate 1 may be measured before preparing the main laminate, and the opening width of the stopper film may be set in the main laminate making step according to thus measured thickness distribution.

Namely, a favorable distribution of opening width W can be set without preparing the first preliminary laminate 2a beforehand if the thickness distribution of the first protective film 131 or the like is directly acquired in the main laminate, and the opening of the stopper film 81 formed in the main laminate 1 is set such that the opening width W becomes greater and smaller at locations where the thickness or the like of the first protective film 131 is greater and smaller, respectively, for example.

Though the above-mentioned embodiment employs the main magnetic poles P1 of the recording magnetic pole films 3 as films to be polished, this is not restrictive. For example, the films to be polished may have any form and size as long as they have at least the same planar form and the same planar size, whereas the opening width W of the stopper film 81 is a width W extending along a line traversing each film to be polished.

Each film to be polished is the main magnetic pole P1 which is part of the recording magnetic pole film 3 in the above-mentioned embodiment, but may be the whole recording magnetic pole film 3 as well. In this case, respective opening widths W can be set for the slit part 82a and wider part 82b, so that their respective thicknesses can be set favorably.

The opening width W can be set freely. When an opening has a circular form, for example, the diameter of the opening can be employed as the opening width.

Though the second protective film 132 is laminated on each laminate in the above-mentioned embodiment, the second protective film 132 may be omitted when the projections 131a are thin, e.g., when the thickness of the recording magnetic pole film 3 is substantially on a par with that of the first protective film 131.

Though the first preliminary laminate 2a is required to have a plurality of main magnetic poles P1 as films to be polished, the second preliminary laminates 2b, 2c, etc. may be embodied as those each including only one main magnetic pole P1 corresponding to any of the main magnetic poles P1 in the first preliminary laminate 2a.

Though the above-mentioned embodiment employs the main magnetic poles P1 of the perpendicular magnetic recording head HD as films to be polished, the present invention is also useful for polishing other thin films as a matter of course.

EXAMPLE

As mentioned above, a first preliminary laminate 2a having a uniform opening width W=100 μm and second preliminary laminates 2b to 2e having respective uniform opening widths W=50, 300, 500, and 1000 μm were made. In each of the first preliminary laminate 2a and second preliminary laminates 2b to 2e, without forming the third shield film 40, reading part 30, second shield film 22, return yoke film 7, junction 6, coil film 5, auxiliary magnetic pole film 4, and insulating film 15 burying them, the main magnetic poles P1 and first protective film 131 were directly laminated on the substrate SB, and then the stopper film 81, second protective film 132, and the like were formed. Since the same film-forming apparatus was used for making the laminates, fluctuations in film-forming thickness in the films of each laminate exhibited a similar tendency among the laminates. The main magnetic poles P1 had the same form and size in each laminate.

Here, a silicon substrate having a diameter of 6 inches and a thickness of 0.6 mm was used as the substrate SB.

As each main pole P1, one made of NiFe having a thickness of 1000 μm was used. Each main magnetic pole P1 had a width X=0.5 μm and a length of 5 μm (see (a) and (b) in FIG. 19). The main magnetic poles P1 were patterned by a known frame plating method.

Each of the first protective film 131 and second protective film 132 was made of alumina, and was formed by 1000 μm by a bias sputtering method.

The stopper film 81 was made of Ta, formed with a thickness of 100 nm by a bias sputtering method, and patterned by a liftoff method. As shown in (b) of FIG. 19, each opening 82 had a rectangular form surrounding its corresponding main magnetic pole P1, whereas the width of the main magnetic pole P1 parallel to the width X of the main magnetic pole P1 was defined as the opening width W.

Figure 20:
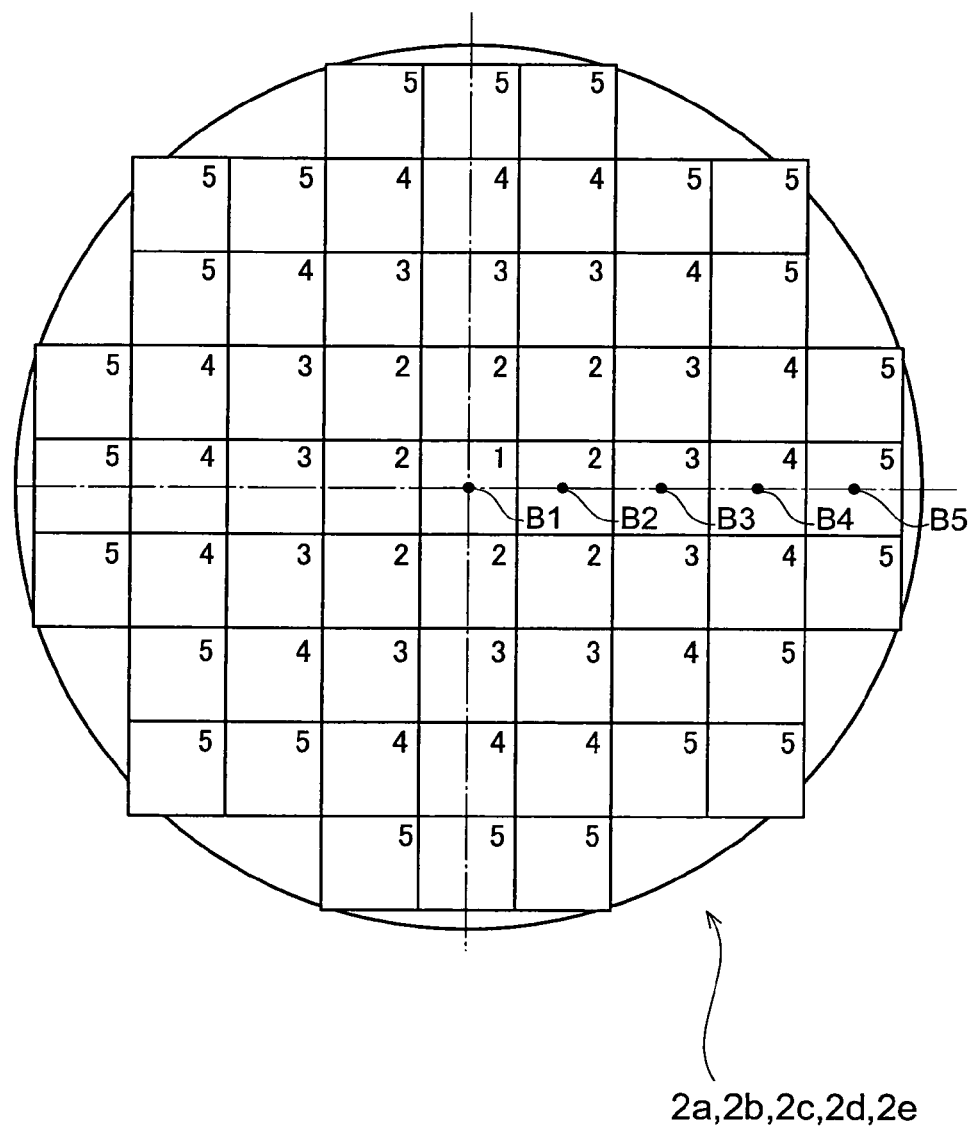
FIG. 20 is a schematic view showing measurement points of the first preliminary laminate 2a, second preliminary laminates 2b to 2e, and main laminate 1 in accordance with the example.

Before polishing, each of the first preliminary laminate 2a and the second preliminary laminates 2b to 2e was sectioned into a matrix as shown in FIG. 20, and respective thicknesses of the main magnetic pole P1, second protective film 132, first protective film 131, and stopper 81 in part of locations (B1 to B5) were measured. By way of example, FIG. 21 shows results of measurement of thicknesses in the first preliminary laminates before polishing. Here, a focused ion beam microscope measured cross sections of samples for thicknesses of the main magnetic pole P1, second protective film 132, first protective film 131, and stopper film 81. In the first preliminary laminate 2a, the thickness of each films varied considerably depending on positions on the substrate. The thicknesses of layers in the second preliminary laminates 2b to 2e exhibited nearly the same values and tendencies as those in the first preliminary laminate 2a.

Subsequently, each of the first preliminary laminate 2a and second preliminary laminates 2b to 2e was polished by a CMP method. For the polishing by the CMP method, Avanti manufactured by Novellus Systems, Inc. was used while employing a pad made of foamed polyurethane and a polishing slurry based on alumina having an alkalinity (pH=10) with a particle size of 0.25 μm. In the polishing operations by the CMP method, the polishing time, load, and the like were the same, so that the thickness of each main magnetic pole P1 became about 800 nm.

Then, the thickness of the main magnetic pole P1 after polishing was measured at each of the locations (B1 to B5). FIG. 21 shows results of measurement of the first preliminary laminate 2a by way of example.

When the CMP was performed with the stopper film 81 having the same opening width, the thickness of the main magnetic pole P1 dispersed considerably. The dispersion was shown in FIG. 21. Here, the dispersion is ((maximum thickness−minimum thickness)/average thickness).

Figure 22:
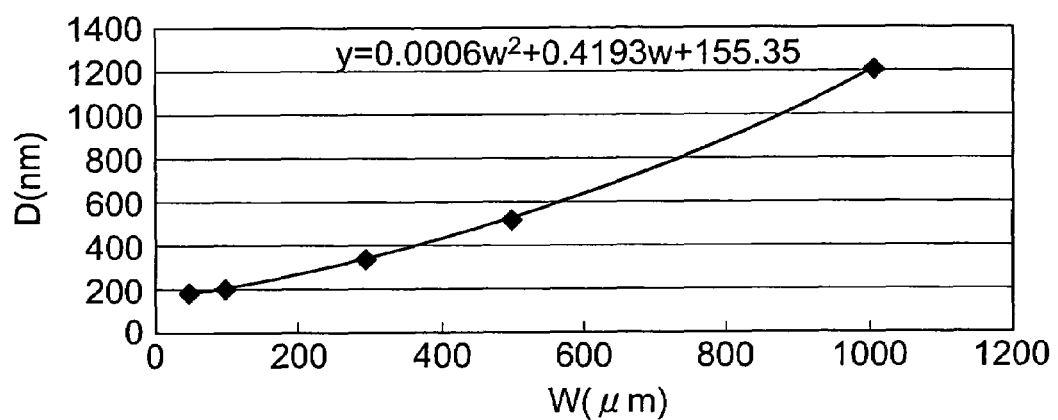
FIG. 22 is a graph showing the correlation between the main magnetic pole thickness and opening width at the position B1 in each of the first preliminary laminate 2a and second preliminary laminates 2b to 2e.

Next, the polishing depth D by the CMP at the center part B1 in each of the first preliminary laminate 2a and second preliminary laminates 2b to 2e was acquired, whereby a correlation between the opening width W and polishing depth D was obtained. Specifically, when W is expressed in terms of μm, the polishing depth D (nm)=0.0006 W²+0.4193 W+155.35. FIG. 22 shows this graph.

Then, respective polishing depths D to be realized in the main magnetic poles P1 according to the polishing depth and thickness distribution concerning the first preliminary laminate 2a were calculated, and respective opening widths W corresponding to the polishing depths D were determined from the correlation equation. Using these opening widths W, a main laminate 1 provided with a distribution of opening width W was obtained. The distribution of opening width W, etc. are shown in FIG. 21. This main laminate was polished by the CMP method as with the first preliminary laminate, and thicknesses of the main magnetic poles P1 were measured after polishing. The results are shown in FIG. 21. The uniformity of thickness in the main magnetic poles P1 was improved extremely.

What is claimed is:

1. A method of polishing a film to be polished comprising:
   a main laminate making step of making a main laminate, including:
      forming a first film that is to be polished onto a first substrate, the first film being patterned so as to have a plurality of first portions, the first portions being discretely distributed at respective positions along a surface of the first substrate;
      covering the first film with a first protective film; and
      forming onto the first protective film a first stopper film provided with a plurality of first openings at respective parts corresponding to respective positions of the first portions, each first opening being wider than a planar width of a corresponding first portion; and
   a main polishing step of polishing the first protective film and the first portions through the first openings of the first stopper film in the main laminate by a CMP method;
   wherein widths of the first openings of the first stopper film have a width distribution provided in the main laminate making step.

2. A method of polishing a film to be polished according to claim 1, the method further comprising, prior to the main laminate making step:
   a first preliminary laminate making step of making a first preliminary laminate, including:
      forming a second film onto a second substrate, the second film being patterned so as to have a plurality of second portions, the second portions being discretely distributed at respective positions along a surface of the second substrate;
      covering the second film with a second protective film, and
      forming onto the second protective film a second stopper film harder to polish than the second protective film and the second film, the second stopper film being provided with a plurality of second openings having a same opening width at respective parts corresponding to respective positions of the second portions; each second opening being wider than a planar width of a corresponding second portion;

a first preliminary polishing step of polishing the second protective film and the second portions through the second openings of the second stopper film in the first preliminary laminate by a CMP method; and a thickness distribution acquiring step of acquiring a thickness distribution of remaining thicknesses of the second portions after the second portions have been polished by the first preliminary polishing step;

wherein the width distribution of the first openings of the first stopper film in the main laminate is set in the main laminate making step according to the thickness distribution.

3. A method of polishing a film to be polished according to claim 2, the method further comprising, prior to the main laminate making step:

a second preliminary laminate making step of making a second preliminary laminate, including:

forming a third film onto a third substrate, the third film being patterned so as to have a plurality of third portions, the third portions being discretely distributed at respective positions along a surface of the third substrate;

covering the third film with a third protective film, and forming onto the third protective film a third stopper film harder to polish than the third protective film and the third film, the third stopper film being provided with a plurality of third openings, each wider than a planar width of corresponding third portion, the third openings having a same opening width different from that of the second openings in the second stopper film of the first preliminary laminate;

a second preliminary polishing step of polishing the third protective film and the third portions by a CMP method through the third openings of the third stopper film in the second preliminary laminate;

a first polishing depth acquiring step of acquiring a first polishing depth distribution associated with the opening width of the second openings of the first preliminary laminate polished by the first preliminary polishing step;

a second polishing depth acquiring step of acquiring a second polishing depth distribution associated with the opening width of the third openings of the second preliminary laminate polished by the second preliminary polishing step; and a correlation acquiring step of acquiring a correlation between polishing depth and opening width according to the opening widths of the second and third stopper films in the first and second preliminary laminates and the polishing depths associated with the opening widths of the second and third openings of the first and second preliminary laminates;

wherein the main laminate making step acquires a set value for polishing depth to be realized in each first opening of the first stopper film in the main laminate according to the first and second polishing depths and thickness distribution, and sets the width distribution of the first openings of the first stopper film in the main laminate according to the set value and the correlation.

4. A method of polishing a film to be polished according to claim 1, wherein the first portions of the first film to be processed have a same planar form and a same planar size; and wherein the widths of the first openings of the first stopper film are each a width extending along a direction across the corresponding each first portion.

5. A method of polishing a film to be polished according to claim 4, wherein the first portions of the first film to be polished each has an elongated rod-like part in plan view, while each first opening of the first stopper film has a slit corresponding to the rod-like part of the corresponding first portion; and wherein the width of each first opening of the first stopper film is a width of the slit.

6. A method of polishing a film to be polished according to claim 1, wherein the main laminate making step further forms a fourth protective film, that is easier to polish than the first stopper film, on the first protective film by way of the first stopper film; and the main polishing step further polishes the fourth protective film by a CMP method.

7. A method of polishing a film to be polished according to claim 1, wherein the first portions of the first film to be polished are magnetic poles of a magnetic head.

8. A method of polishing a film to be polished according to claim 1, wherein widths of the first openings of the first stopper film have a width distribution provided in the main laminate making step, so as to achieve a substantially uniform thickness among the first portions of the first film.

* * * * *